P. DRAIS.
Hog-Trap.
No. 211,717. Patented Jan. 28, 1879.
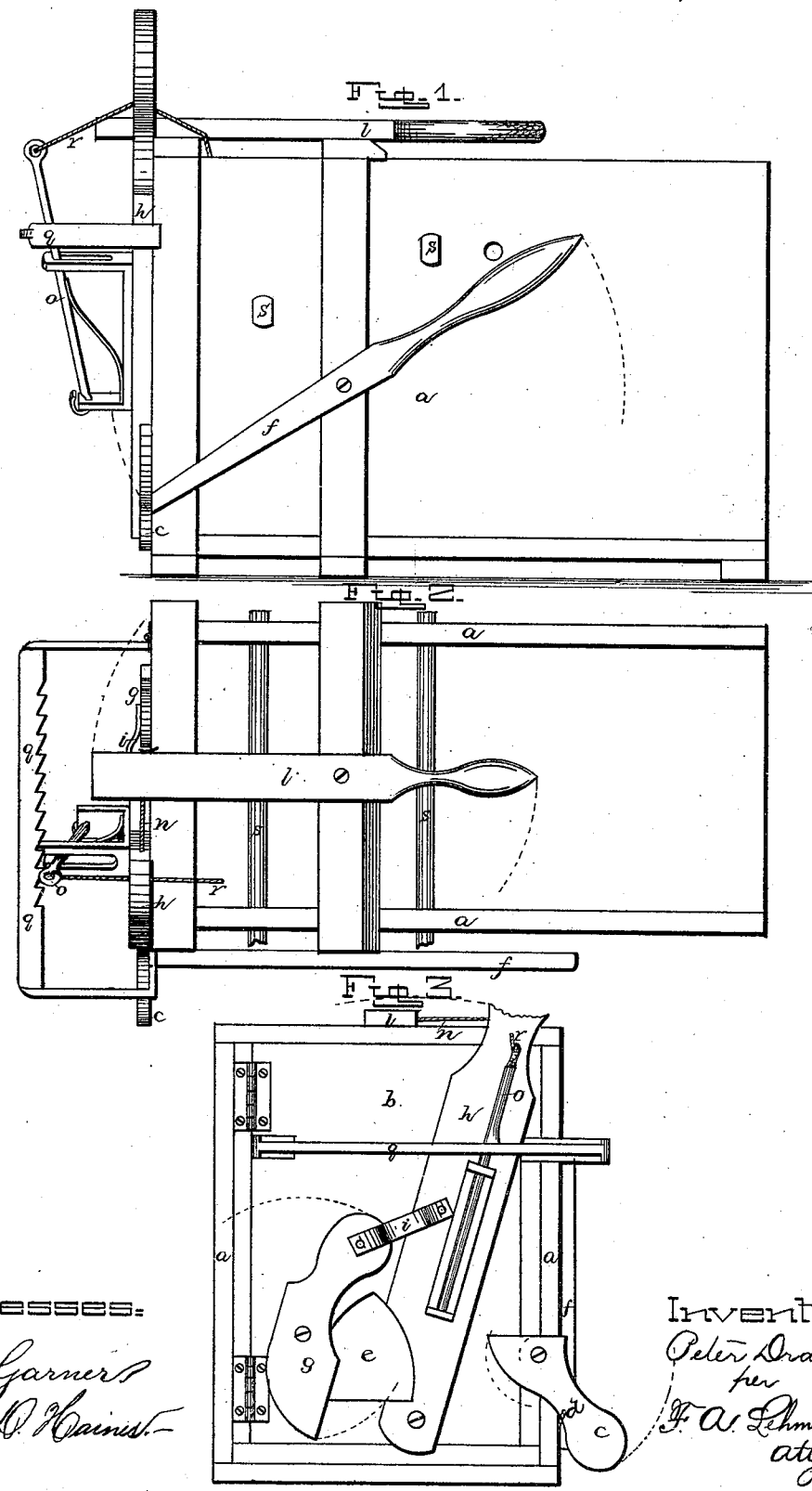

UNITED STATES PATENT OFFICE.

PETER DRAIS, OF WASHINGTON COURT-HOUSE, OHIO.

IMPROVEMENT IN HOG-TRAPS.

Specification forming part of Letters Patent No. 211,717, dated January 28, 1879; application filed December 4, 1878.

*To all whom it may concern:*

Be it known that I, PETER DRAIS, of Washington Court-House, in the county of Fayette and State of Ohio, have invented certain new and useful Improvements in Hog-Traps; and I do hereby declare the following to be a full, clear, and exact description of the invention, such as will enable others skilled in the art to which it pertains to make and use it, reference being had to the accompanying drawings, which form part of this specification.

My invention relates to an improvement in hog-traps; and it consists in the arrangement and combination of parts that will be more fully described hereinafter, whereby the construction of the trap and the ease of operating it are greatly improved.

Figure 1 is a side elevation, Fig. 2 is an end view, and Fig. 3 a plan view, of my invention.

$a$ represents a suitable box-like frame, constructed in any desired manner. The opposite end of the frame from where the hog enters is closed by the hinged door $b$, which not only closes the entire end of the frame, but has the levers for holding the animal secured to it.

Pivoted upon the front end of the frame is the latch $c$, which is connected by a cord, wire, or chain, $d$, to the long lever $f$, pivoted upon the side of the frame. By means of this lever, which reaches back past the center of the frame, the door may be fastened or unfastened without the trouble of walking up to it. By having the door at the end of the frame it may be opened, so as to make it appear to the hogs that they can run through the frame, and thus tempt them to enter, and after they have entered the door can be closed upon them. This saves a great deal of trouble in driving the hogs into the trap.

Upon one side of the hole $e$ in the door, through which the hog sticks his head, is pivoted the short lever $g$, which is connected at its upper end by a flexible connection, $i$, with the long lever $h$, which is pivoted at its lower end on the other side of the hole. By pushing the long lever to the left the two levers will be made to hold the hog's head with any desired degree of force, and by pulling to the right the animal will be released. In order to operate this lever $h$ from the side of the trap or from the rear end, there is a lever, $l$, pivoted upon the top of the trap, which is connected at its front end by a flexible connection, $n$, with the lever $h$.

By drawing the rear end of the lever toward the side of the trap on which the lever $f$ is pivoted, the two clamping-levers can be made to instantly close upon the animal.

Secured to the front side of the lever $h$ is a spring-catch, $o$, which engages with a ratchet-frame, $q$, secured to the door $b$, for the purpose of holding the lever in any desired position.

Fastened to the upper end of the catch is a rope or wire, $r$, which passes through the top of the lever $h$, and extends back any desired distance, so that the catch may be drawn back out of contact with the ratchet $q$, and thus leave the lever $h$ free to be moved in either direction by the lever $l$. By means of this arrangement of parts the trap may be operated with as much ease by a single person as most traps can be operated by two. The wire or rope $r$ also serves to draw the door shut when open, so that a person need not walk around the trap for that purpose.

Passed through the sides of the frame are the removable rods $s$, which serve to prevent the hog from rising up on his hind legs, and guides him toward the opening between the two jaws or levers.

Having thus described my invention, I claim—

1. The combination of the lever $g$, connection $i$, levers $h$ $l$, and connection $n$, substantially as set forth.

2. The combination of the door $b$, levers $g$ $h$, spring-catch, ratchet-frame, and cord or wire $r$, whereby when the door is opened the entire end of the frame is left clear, substantially as specified.

In testimony that I claim the foregoing I have hereunto set my hand this 27th day of November, 1878.

PETER DRAIS.

Witnesses:
J. L. McKEE,
J. B. PRIDDY.